United States Patent
Maes

(10) Patent No.: US 9,246,953 B2
(45) Date of Patent: Jan. 26, 2016

(54) PROTOCOL LEVEL COMMUNICATIONS FOR PROTOCOL LEVEL COMPOSITION WITH SESSION SHARING

(75) Inventor: Stephane H. Maes, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 616 days.

(21) Appl. No.: 12/831,603

(22) Filed: Jul. 7, 2010

(65) Prior Publication Data

US 2011/0119391 A1  May 19, 2011

Related U.S. Application Data

(60) Provisional application No. 61/262,785, filed on Nov. 19, 2009.

(51) Int. Cl.
G06F 15/16 (2006.01)
G06F 15/173 (2006.01)
H04L 29/06 (2006.01)

(52) U.S. Cl.
CPC ........ H04L 65/1046 (2013.01); H04L 65/1069 (2013.01)

(58) Field of Classification Search
CPC .................. H04L 65/1046; H04L 65/1069
USPC .................................................. 709/230, 242
See application file for complete search history.

(56) References Cited

U.S. PATENT DOCUMENTS

| | | | | |
|---|---|---|---|---|
| 7,523,219 | B2 * | 4/2009 | Cuomo et al. | 709/238 |
| 7,940,650 | B1 * | 5/2011 | Sandhir et al. | 370/219 |
| 8,161,172 | B2 * | 4/2012 | Reisman | 709/228 |
| 2002/0176355 | A1 * | 11/2002 | Mimms et al. | 370/216 |
| 2005/0234943 | A1 * | 10/2005 | Clarke | 707/100 |
| 2006/0059253 | A1 * | 3/2006 | Goodman et al. | 709/223 |
| 2006/0227723 | A1 * | 10/2006 | Vasseur et al. | 370/254 |
| 2007/0237161 | A1 * | 10/2007 | Akisada | 370/400 |
| 2008/0192638 | A1 * | 8/2008 | Massiera et al. | 370/237 |
| 2009/0187919 | A1 * | 7/2009 | Maes | 719/313 |
| 2009/0201917 | A1 * | 8/2009 | Maes et al. | 370/352 |

* cited by examiner

*Primary Examiner* — Minh-Chau Nguyen
(74) *Attorney, Agent, or Firm* — Kilpatrick Townsend & Stockton LLP

(57) ABSTRACT

Embodiments of the invention provide systems and methods for composition of elements in a communication session with session sharing. According to one embodiment, a method for composition of elements in a communication session can comprise processing the communication session with a first element participating in the communication session, updating state information for the communication session with the first element based on the processing of the communication session by the first element, and passing the state information from the first element to a second element participating in the communication session. The method can further comprise receiving the state information from the first element at the second element, processing the communication session with the second element based on the state information for the communication session, and updating the state information for the communication session with the second element based on the processing of the communication session by the second element.

13 Claims, 13 Drawing Sheets

PROTOCOL LEVEL COMMUNICATIONS FOR PROTOCOL LEVEL COMPOSITION WITH SESSION SHARING

CROSS-REFERENCE TO RELATED APPLICATIONS

This application is related to and claims the benefit of U.S. Provisional Patent Application No. 61/262,785 filed Nov. 19, 2009 by Maes and entitled "Protocol Level Communications for Protocol Level Composition With Session Sharing" of which the entire disclosure is incorporated herein by reference for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Embodiments of the present invention relate generally to methods and systems for processing and routing of messages and information in a computer network and more particularly to composition of elements in a communication session with session sharing.

As computer networks become evermore complex, and are further extended to include functionality for wireless and mobile devices, there is an increasing need to orchestrate interaction between the capabilities of the various components across the network. The Service Capability Interaction Manager (SCIM) was introduced (by the Third Generation Partnership Project, or "3GPP") as a functional architecture for the provisioning of services. A SCIM typically is used to orchestrate the delivery of services among different servers including application server platforms. A SCIM component can be programmed or configured to dictate the sequence of services or operations used to process a communication session.

However, a SCIM performs composition and orchestration of a communication session in a top-down type approach wherein the orchestration and session state are controlled at a high level, i.e., in the application session or service layer, removed from the applications and/or protocol level components participating in the session, i.e., the protocol session layer. That is, session state sharing between components such as various protocol session level components is not performed. As a result, if a protocol session level component or other element participating in a communication session performs some processing that affects the state of the communication session, that change is not shared between other such components. Rather, the change must be propagated back up to the orchestrator which then directs the other elements. In fact, it is generally not possible for protocol session level components to share such communication session state or context information since programming models for the protocol session level do not allow such sharing. Such an approach can be less efficient or desirable than allowing the elements of the architecture to share the session state information and/or context of the communication session and perform composition. Hence, there is a need for improved methods and systems for composition of elements in a communication session with session sharing.

BRIEF SUMMARY OF THE INVENTION

Embodiments of the invention provide systems and methods for composition of elements in a communication session with session sharing. According to one embodiment, a method for composition of elements in a communication session can comprise processing the communication session with a first element participating in the communication session, updating state information for the communication session with the first element based on the processing of the communication session by the first element, and passing the state information from the first element to a second element participating in the communication session. The method can further comprise receiving the state information from the first element at the second element, processing the communication session with the second element based on the state information for the communication session, and updating the state information for the communication session with the second element based on the processing of the communication session by the second element. For example, the state information for the communication session can comprise routing information, routing logic, status information related to the processing of the communication session, and/or any other information about or related to the communication session.

The communication session can comprise an application session and a protocol session. The application session can comprise applications, enablers, services, orchestrated processes, and/or other components participating in and/or directing the communication session while the protocol session level components can comprise components implementing or supporting the session one a communication network in a specific protocol. In a particular example, the first element can comprise a first protocol session level component and the second element can comprise a second protocol session level component. In this example, the state information can be passed from the first protocol session level component to the second protocol session level component by passing the state information as part of a header of a protocol session level message.

In another example, the first element can comprise a first protocol session level component and the second element can comprise a second protocol session level component. In this example, the state information can be passed from the first protocol session level component to the second protocol session level component by passing the state information out of band from protocol session level exchanges between the first protocol session level component and the second protocol session level component.

In yet another example, the first element can comprise an application session level component and the second element can comprise a first protocol session level component. In this example, passing the state information from the application session level component to the first protocol session level component can comprise passing the state information as part of a header of a protocol specific message. This example can further comprise passing the updated state information from the first protocol session level component to the application session level component, processing the communication session with the application session level component based on the updated state information from the first protocol session level component and possibly application session state and/or context information or interactions with other application session level components, passing the updated state information for the communication session from the application session level component to a second protocol session level component, and processing the communication session with the second protocol session level component based one the updated state information for the communication session from the application session level component.

In still another example, the first element can comprise an application session level component and the second element can comprise a first protocol session level component. In this example, passing the state information from the application session level component to the first protocol session level component can comprise passing the state information out of band from protocol specific exchanges between the application session level component and the first protocol session level component. This example can further comprise passing the updated state information from the first protocol session level component to the application session level component, processing the communication session with the application session level component based on the updated state information from the first protocol session level component and possibly application session state and/or context information or interactions with other application session level components, passing the state information for the communication session from the application session level component to a second protocol session level component out of band from protocol specific exchanges between the application session level component and the second protocol session level component, and processing the communication session with the second protocol session level component based one the state information for the communication session from the application session level component.

In yet another example, the first element can comprise a first protocol session level component and the second element can comprise a second protocol session level component. In this example, passing the state information from the first protocol session level component to the second protocol session level component can comprise passing the state information out of band from protocol specific exchanges between an application session level component and the first protocol session level component and the application session level component and the second protocol session level component.

In still another example, the first element can comprise a first protocol session level component and the second element can comprise a second protocol session level component. In this example, passing the state information from the first protocol session level component to the second protocol session level component can comprise writing the state information for the communication session to a set of shared information with the first protocol session level component and reading the state information for the communication session from the set of shared information with the second protocol session level component.

According to another embodiment, a system can comprise a communication network adapted to support a communication session via a signaling protocol such as, for example, Session Initiation Protocol (SIP). A first element can be communicatively coupled with the communication network and can participate in the communication session. The first element can be adapted to perform communication session processing and update state information for the communication session based on the communication session processing. The system can also include a second element communicatively coupled with the communication network and participating in the communication session. The first element can be further adapted to pass the state information to the second element. The second element can be further adapted to receive the state information from the first element, perform communication session processing based on the state information for the communication session, and update the state information for the communication session based on the communication session processing. For example, the state information for the communication session can comprise routing information, routing logic, status information related to the processing of the communication session, and/or any other information about or related to the communication session.

The communication session can comprise an application session and a protocol session. The application session can comprise applications, enablers, services, orchestrated processes, and/or other components participating in and/or directing the communication session while the protocol session level components can comprise components implementing or supporting the session one a communication network in a specific protocol. In a particular example, the first element can comprise a first protocol session level component and the second element can comprise a second protocol session level component. In this example, passing the state information from the first protocol session level component to the second protocol session level component can comprise passing the state information as part of a header of a protocol session level message.

In another example, the first element can comprise a first protocol session level component and the second element can comprise a second protocol session level component. In this example, passing the state information from the first protocol session level component to the second protocol session level component can comprise passing the state information out of band from protocol session level exchanges between the first protocol session level component and the second protocol session level component.

In yet another example, the first element can comprises an application session level component and the second element can comprise a first protocol session level component. In this example, passing the state information from the application session level component to the first protocol session level component can comprise passing the state information as part of a header of a protocol specific message. This example can further comprise a second protocol session level component. The first protocol session level component can be adapted to pass the updated state information to the application session level component. The application session level component can be adapted to process the communication session based on the updated state information from the first protocol session level component and possibly application session state and/or context information or interactions with other application session level components, and pass the updated state information for the communication session to the second protocol session level component. The second protocol session level component can be adapted to process the communication session based one the updated state information for the communication session from the application session level component.

In still another example, the first element can comprise an application session level component, the second element comprises a first protocol session level component, and passing the state information from the application session level component to the first protocol session level component can comprise passing the state information out of band from protocol specific exchanges between the application session level component and the first protocol session level component. This example can further comprise a second protocol session level component. The first protocol session level component can be further adapted to pass the updated state information to the application session level component. The application session level component can be further adapted to process the communication session based on the updated state information from the first protocol session level component and possibly application session state and/or context information or interactions with other application session level components and pass the state information for the communication session to the second protocol session level component out of band from protocol specific exchanges between the application session level component and the second protocol session level component. The second protocol session level component can be adapted to perform communication session processing based one the state information for the communication session from the application session level component.

In yet another example, the first element can comprise a first protocol session level component and the second element can comprise a second protocol session level component. In this example, passing the state information from the first protocol session level component to the second protocol session level component can comprise passing the state information out of band from protocol specific exchanges between an application session level component and the first protocol session level component and the application session level component and the second protocol session level component.

In still another example, the first element can comprise a first protocol session level component and the second element can comprise a second protocol session level component. In this example, passing the state information from the first protocol session level component to the second protocol session level component can comprise writing the state information for the communication session to a set of shared information with the first protocol session level component and reading the state information for the communication session from the set of shared information with the second protocol session level component.

According to yet another embodiment, a machine-readable medium can have stored thereon a series of instruction which, when executed by a processor, cause the processor to perform composition of elements in a communication session by processing the communication session with a first element participating in the communication session, updating state information for the communication session with the first element based on the processing of the communication session by the first element, and passing the state information from the first element to a second element participating in the communication session. The state information can be received from the first element at the second element, the communication session can be processed with the second element based on the state information for the communication session, and the state information for the communication session can be update with the second element based on the processing of the communication session by the second element. For example, the state information for the communication session can comprise routing information, routing logic, status information related to the processing of the communication session, and/or any other information about or related to the communication session.

The communication session can comprise an application session and a protocol session. The application session can comprise applications, enablers, services, orchestrated processes, and/or other components participating in and/or directing the communication session while the protocol session level components can comprise components implementing or supporting the session one a communication network in a specific protocol. In a particular example, the first element can comprise a first protocol session level component and the second element can comprise a second protocol session level component. In this example, the state information can be passed from the first protocol session level component to the second protocol session level component by passing the state information as part of a header of a protocol session level message.

In another example, the first element can comprise a first protocol session level component and the second element can comprise a second protocol session level component. In this example, the state information can be passed from the first protocol session level component to the second protocol session level component by passing the state information out of band from protocol session level exchanges between the first protocol session level component and the second protocol session level component.

In yet another example, the first element can comprise an application session level component and the second element can comprise a first protocol session level component. In this example, passing the state information from the application session level component to the first protocol session level component can comprise passing the state information as part of a header of a protocol specific message. This example can further comprise passing the updated state information from the first protocol session level component to the application session level component, processing the communication session with the application session level component based on the updated state information from the first protocol session level component and possibly application session state and/or context information or interactions with other application session level components, passing the updated state information for the communication session from the application session level component to a second protocol session level component, and processing the communication session with the second protocol session level component based one the updated state information for the communication session from the application session level component.

In still another example, the first element can comprise an application session level component and the second element can comprise a first protocol session level component. In this example, passing the state information from the application session level component to the first protocol session level component can comprise passing the state information out of band from protocol specific exchanges between the application session level component and the first protocol session level component. This example can further comprise passing the updated state information from the first protocol session level component to the application session level component, processing the communication session with the application session level component based on the updated state information from the first protocol session level component and possibly application session state and/or context information or interactions with other application session level components, passing the state information for the communication session from the application session level component to a second protocol session level component out of band from protocol specific exchanges between the application session level component and the second protocol session level component, and processing the communication session with the second protocol session level component based one the state information for the communication session from the application session level component.

In yet another example, the first element can comprise a first protocol session level component and the second element can comprise a second protocol session level component. In this example, passing the state information from the first protocol session level component to the second protocol session level component can comprise passing the state information out of band from protocol specific exchanges between an application session level component and the first protocol session level component and the application session level component and the second protocol session level component.

In still another example, the first element can comprise a first protocol session level component and the second element can comprise a second protocol session level component. In this example, passing the state information from the first protocol session level component to the second protocol session level component can comprise writing the state information for the communication session to a set of shared information with the first protocol session level component and reading the state information for the communication session from the set of shared information with the second protocol session level component.

DETAILED DESCRIPTION OF THE INVENTION

Figure 1:
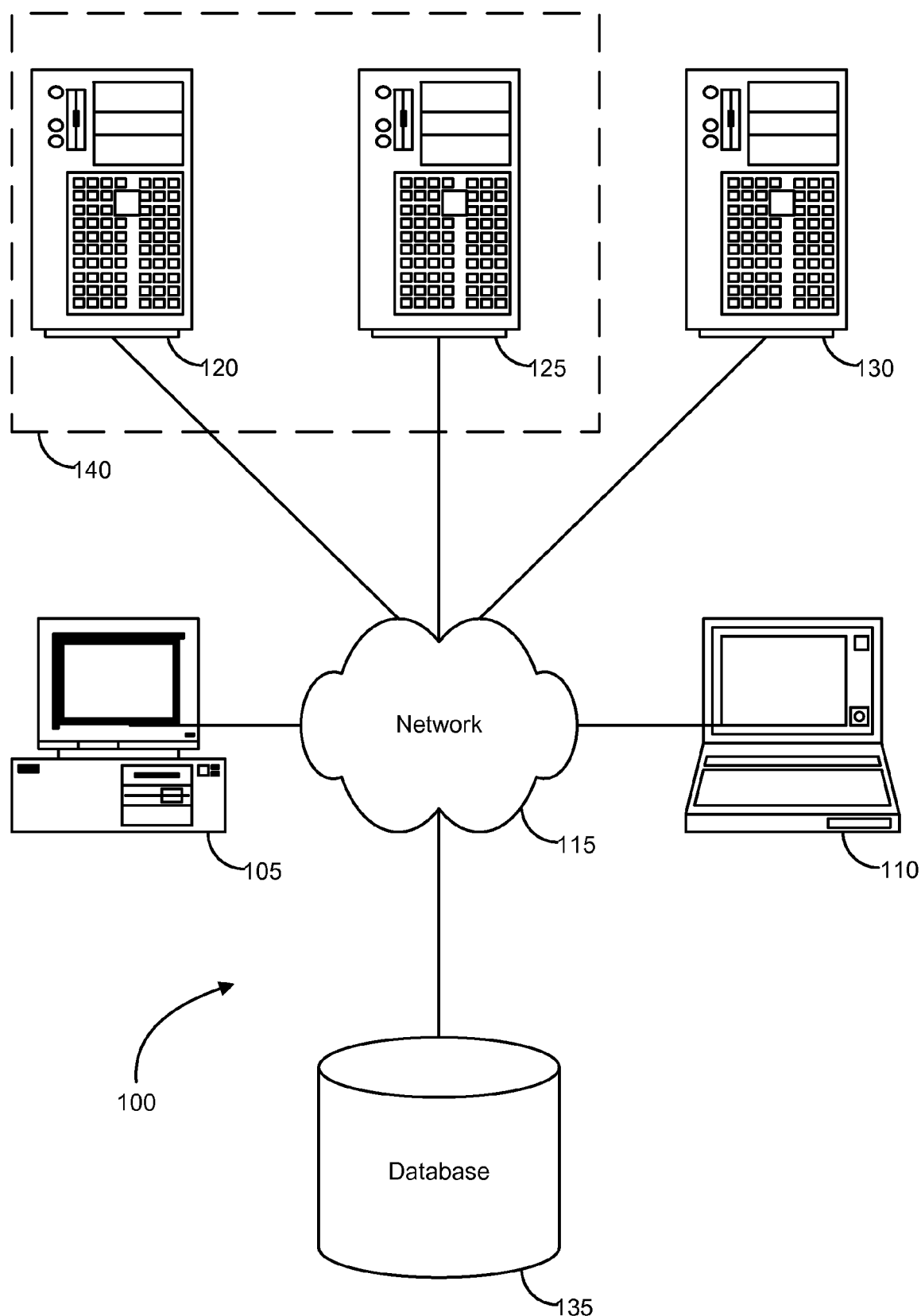
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for composition of elements in a communication session with session sharing. More specifically, embodiments of the present invention provide for composing elements of or participating in a communication session and sharing session state information between any number of such elements of different types. The communication session can comprise an application session and a protocol session. Elements that may be implemented in or participate in a communication session can comprise application session level components, protocol session level components, and/or combinations thereof. The application session level components can comprise applications, enablers, services, orchestrated processes, and/or other components participating in and/or directing the communication session. For example, the application session level components can include but are not limited to a Business Process Execution Language (BPEL) workflow, a Service Oriented Architecture (SOA) application, etc. The protocol session level components can comprise components implementing and/or supporting the communication session one a communication network in a specific protocol. For example, protocol session level components can include but are not limited to Session Initiation Protocol (SIP) servlets, e.g., Java Specification Request (JSR) 116 or 289, southbound adapters of enablers, etc.

Passing or sharing of communication session state information between these elements can be performed in different ways without departing from the scope of the present invention. Generally described, these various ways of sharing communication session state information can include but are not limited to passing state information between elements as part of a protocol session level message, e.g., as part of an expanded header, passing communication session state information as part of a message out of band with protocol session level messages between elements, or by reading/writing state information to a common, shared store of state information. According to one embodiment, these exchanges may be provided through one or more Application Program Interfaces (APIs) used to access and, in some cases, manipulate the state information. Furthermore, passing or sharing of session state information in these different manners can be performed synchronously, i.e., by locking the state information, performing updates of the state information, and unlocking the state information to make the update available to other elements, or asynchronously, i.e., by requesting a change of the state information and receiving and/or providing a notification or update of the changed state information when completed. Various approaches to performing such synchronous and asynchronous processing can be understood by one skilled in the art. Such variations are contemplated and considered to be within the scope of the present invention.

Stated another way, composition of elements in a communication session can comprise processing the communication session with a first element participating in the communication session, updating state information for the communication session with the first element based on the processing of the communication session by the first element, and passing the state information from the first element to a second element participating in the communication session. In some cases, a third element can intervene and modify or update the state information. For example, an application, orchestrator, or other application session level component may perform communication session processing and update the state of communication session based thereon. The state information from the first element can be received at the second element, the communication session can be processed with the second element based on the state information for the communication session, and the state information for the communication session can be updated with the second element based on the processing of the communication session by the second element. For example, the state information for the communication session can comprise routing information, routing logic, status information related to the processing of the communication session, and/or any other information about or related to the communication session. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers, laptop computers, phones, Personal Digital Assistants (PDAs), tablet devices, set-top boxes, and/or other computing devices running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO, HSDPA, WiMAX, etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
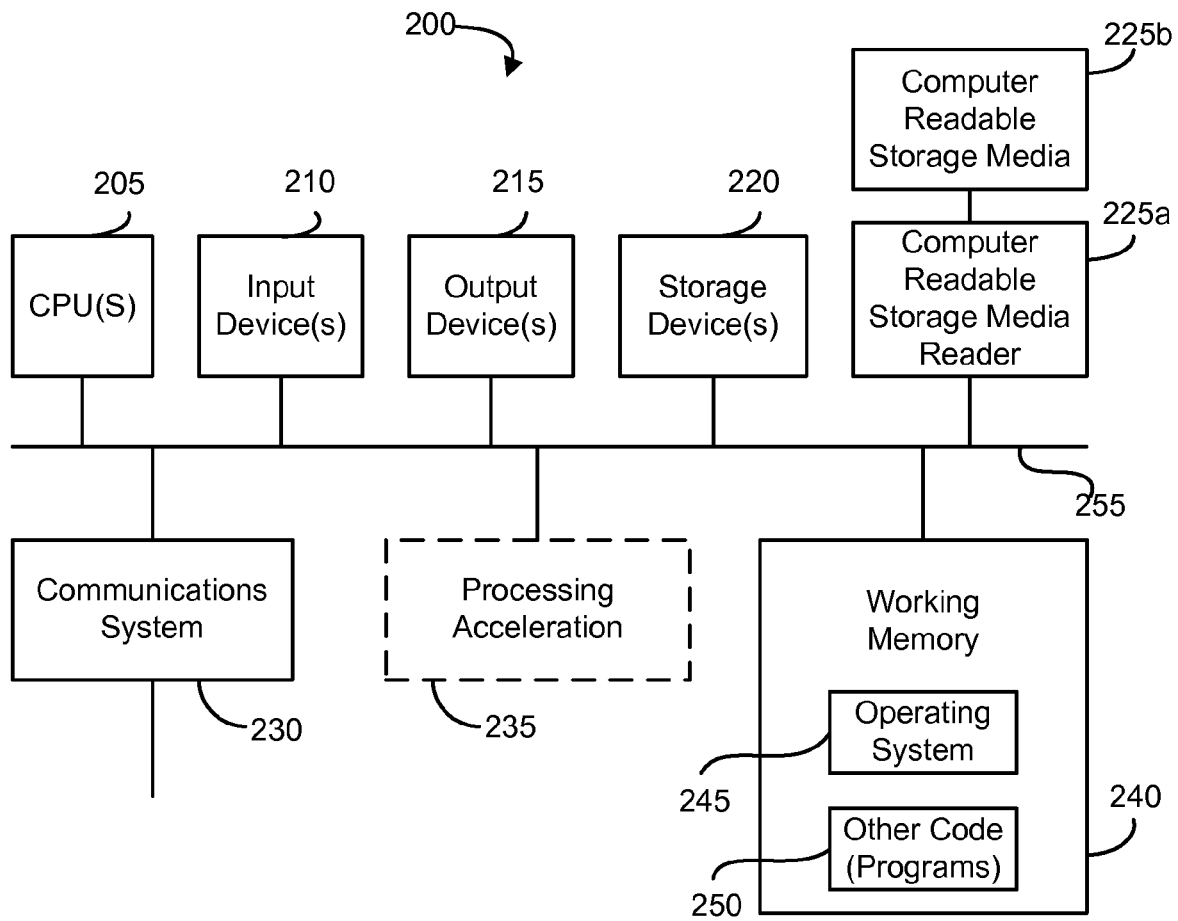
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
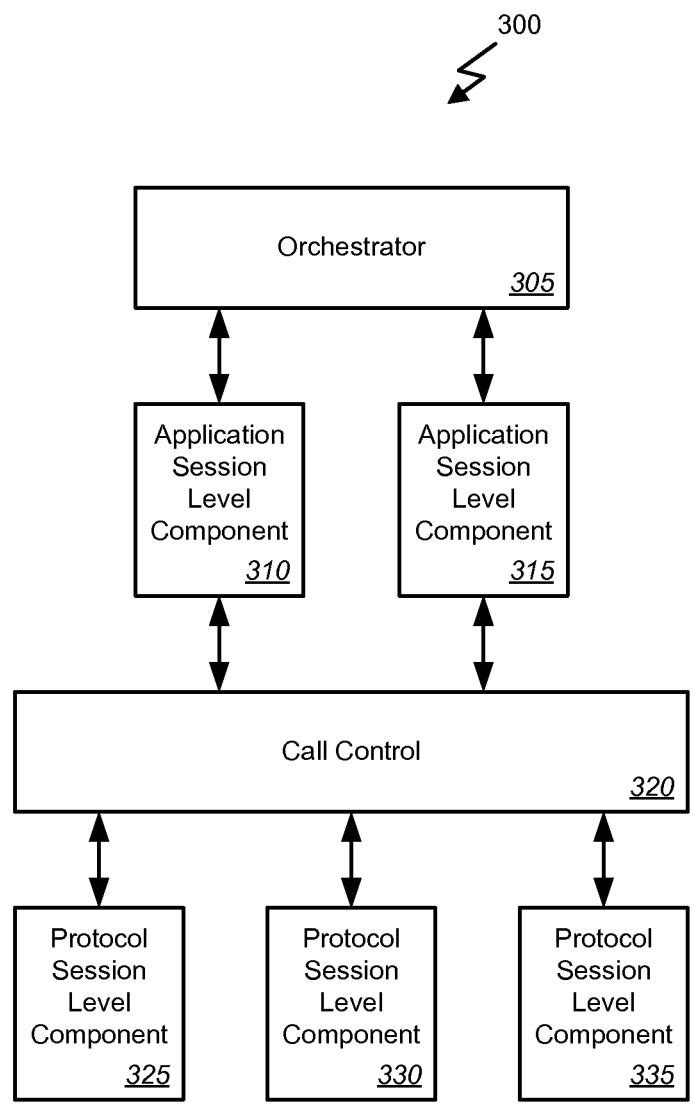
FIG. 3 is a block diagram illustrating, at a high-level, functional components of a system for composition of elements in a communication session with session sharing according to one embodiment of the present invention.

FIG. 3 is a block diagram illustrating, at a high-level, functional components of a system for composition of elements in a communication session with session sharing according to one embodiment of the present invention. As illustrated here, the system 300 can comprise an orchestrator 305, one or more application session level components 310 and 315, a call controller 320, and one or more protocol session level components 325-335. Generally speaking, the orchestrator 305 can comprise a system of module adapted to control or direct activities of one or more of the other elements of the system 300, for example, by application of one or more policies. In one embodiment, the orchestrator 305 can comprise a Business Process Execution Language (BPEL) orchestrator for example.

The application session level components 310 and 315 can comprise any of a variety of standard or custom applications to perform functions including but not limited to call control, media control, billing, access control, etc. The application session level components 310 and 315 can comprise applications, enablers, services, orchestrated processes, and/or other components participating in and/or directing the communication session. For example, the application session level components 310 and 315 can include but are not limited to a BPEL workflow, a Service Oriented Architecture (SOA) application, etc.

The call controller 320 can comprise a system or module adapted to connect and control a call or communication session between two or more of the other elements of the system 300. For example, the call controller 320 can comprise a call control enabler such as described in U.S. patent application Ser. No. 11/949,930 filed Dec. 4, 2007 by Maes and entitled "Call Control Enabler Abstracted from Underlying Network Technologies" the entire disclosure of which is incorporated herein by reference for all purposes. It should be understood that the call control controller 320 is not required. For example, in other implementations the application level components 310 and 315 may interact with the protocol session level components 325-335 via APIs or other interfaces exposed by those components, e.g., in the case that the protocol session level components comprise SIP servlets, the application session level components 310 and 315 can interact with the protocol session level components 325-335 via J2EE Connector Architecture (JCA) interfaces. In other implementations, various other interfaces may be used between the application session level components 310 and 315 and the protocol session level components 325-335 including but not limited to Java, Diameter, etc. Additionally, while only one call controller 320 is illustrated here, it should be understood that more than one call controller 320 may be used in different implementations. For example, one call controller may be implemented for each protocol session level component or for a subset or group of protocol level components.

The protocol session level components 325-335 can comprise any type of module, device, system, etc adapted to communicate via a communication network using a specific communication protocol. For example, such a communication protocol can comprise a signaling protocol such as Session Initiation Protocol (SIP). Protocol session level components 325-335 can include but are not limited to SIP servlets, e.g., Java Specification Request (JSR) 116 or 289, southbound adapters of the call controller 320 for interacting with additional network elements not shown here, etc. While not shown here for clarity sake, the system 300 can also comprise a communication network such as any WAN, LAN, Internet or other network such as described above and used to communicatively couple any and/or all of the elements of the system 300.

As noted above, embodiments of the present invention provide for composing elements of or participating in a communication session and sharing communication session state information between any number of such elements of different types. So for example elements that may be composed can comprise the orchestrator 305, application session level components 310 and 315, protocol session level components 325-335, and/or combinations thereof. Furthermore, passing or sharing of communication session state information between these elements can be performed in different ways without departing from the scope of the present invention. Generally described, these various ways of sharing communication session state information can include but are not limited to passing state information between elements as part of a protocol session level message, e.g., as part of an expanded header, passing communication session state information as part of a message out of band with protocol session level messages between elements, or by reading/writing state information to a common, shared store of state information. Furthermore, passing or sharing of session state information in these different manners can be performed synchronously, i.e., by locking the state information, performing updates of the state information, and unlocking the state information to make the update available to other elements, or asynchronously, i.e., by requesting a change of the state information and receiving and/or providing a notification or update of the changed state information when completed. Various approaches to performing such synchronous and asynchronous processing can be understood by one skilled in the art.

Using these different approaches, communication session state information can be shared between any and/or all of the elements participating in a communication session which can then update the information based on the processes performed thereby. Therefore, control of the communication session need not be performed solely by the orchestrator 305. That is, rather than imposing a top-down type approach in which the orchestrator 305 maintains control of the communication session and directs the communication session and elements participating therein, any or all of the other elements can receive, update, and pass communication session state information to influence the composition of the communication session.

Stated another way, a system 300 can comprise a communication network adapted to support a communication session via a signaling protocol such as, for example, Session Initiation Protocol (SIP). A first element, such as a protocol session level component 325, can be communicatively coupled with the communication network and can participate in the communication session. The first element can be adapted to perform communication session processing and update state information for the communication session based on the communication session processing. The system 300 can also include a second element, such as another protocol session level component 330 or application session level component 315, communicatively coupled with the communication network and participating in the communication session. The first element can be further adapted to pass the state information to the second element. The second element can be further adapted to receive the state information from the first element, perform communication session processing based on the state information for the communication session, and update the state information for the communication session based on the communication session processing. For example, the state information for the communication session can comprise routing information, routing logic, status information related to the processing of the communication session, and/or any other information about or related to the communication session.

The first element and second element described here, as well as any other elements that may be implemented, can comprise the orchestrator 305, application session level components 310 and 315, protocol session level components 325-335, and/or any combinations thereof. Furthermore, passing or sharing of communication session state information between these elements can be performed in different ways without departing from the scope of the present invention. Generally described, these various ways of sharing communication session state information can include but are not limited to passing state information between elements as part of a protocol session level message, e.g., as part of an expanded header, passing communication session state information as part of a message out of band with protocol specific messages between elements, or by reading/writing state information to a common, shared store of state information. Various examples of different ways to perform communication session state sharing between different types of elements will be described with reference to FIGS. 5-10.

Figure 4:
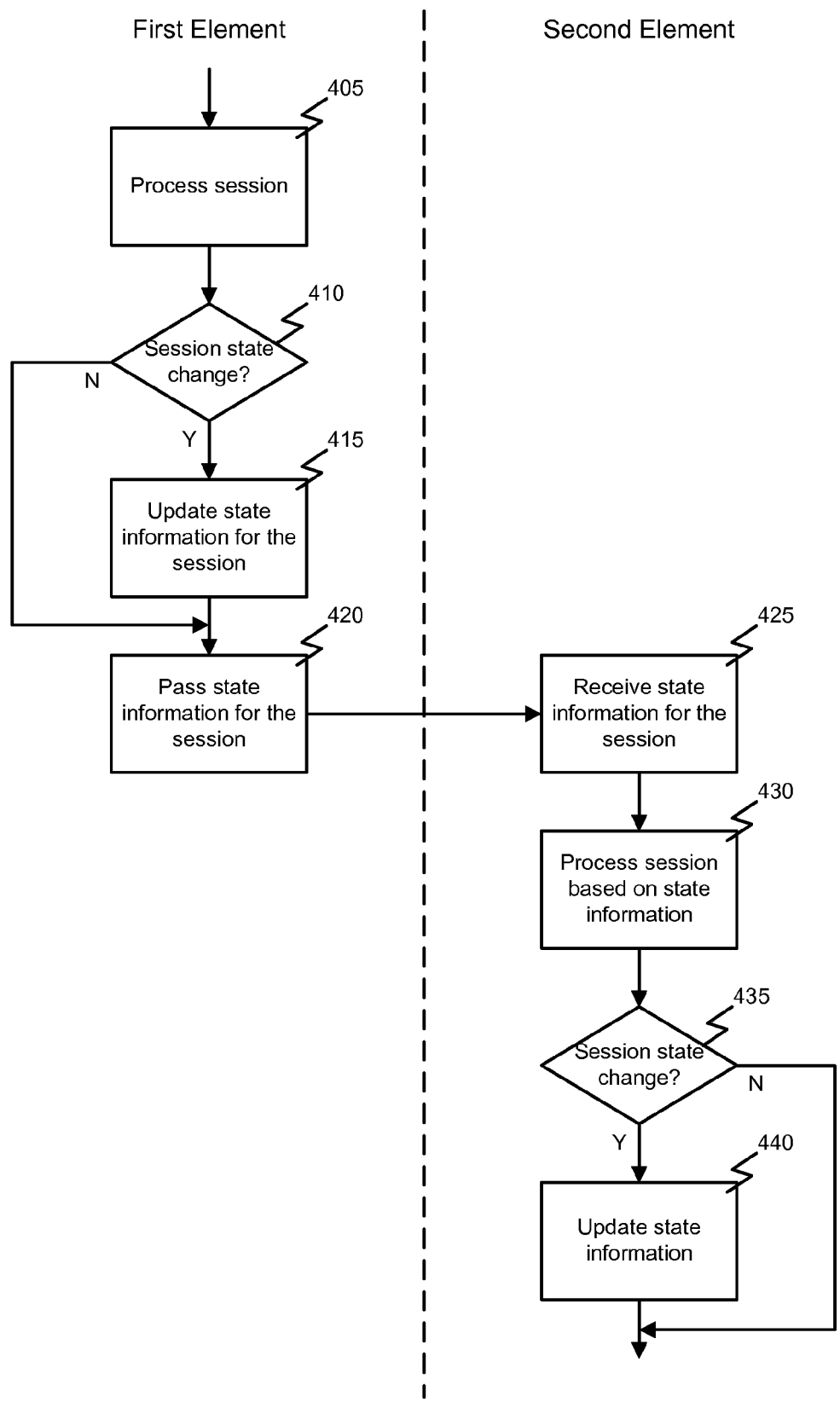
FIG. 4 is a flowchart illustrating a process for composition of elements in a communication session with session sharing according to one embodiment of the present invention.

FIG. 4 is a flowchart illustrating a process for composition of elements in a communication session with session sharing according to one embodiment of the present invention. In this example, process can begin with processing 405 the communication session with a first element participating in the communication session. Processing 405 the communication session can comprise any of a number of different functions including but not limited to initiating the communication session, joining the communication session, requesting another party to join the communication session, etc. A determination can be made as to whether the processing 405 performed by the first element affects or changes the state of the communication session. As noted above, the state information for the communication session can comprise any of a variety of information including but not limited to information for regarding routing of the communication session, status of the communication session, preference information for parties to the communication session, or any other information related to the communication session and/or the participants. So, for example, if the first element is initiating or joining the communication session, a determination 410 can be made that the state information should be update to reflect or include information related to the first elements participation in the communication session. In another example, processing the communication session by the first element may change the routing or other handling of the communication session by other elements therefore leading to a determination 410 that the communication session state has changed.

In any event, in response to determining 410 that the processing 405 by the first element changes the state of the communication session, state information for the communication session can be updated 415 by the first element based on the processing 405 of the communication session by the first element. The state information can then be passed 420 by the first element to a second element participating in the communication session. As noted above, passing 420 the state information to the second element can be done in different manners and will be described in greater detail below with reference to the examples illustrated by FIGS. 5-10. As noted, passing 420 or sharing of session state information in these different manners can be performed synchronously, i.e., by locking the state information, performing updates of the state information, and unlocking the state information to make the update available to other elements, or asynchronously, i.e., by requesting a change of the state information and receiving and/or providing a notification or update of the changed state information when completed. Various approaches to performing such synchronous and asynchronous processing can be understood by one skilled in the art.

The second element can in turn receive 425 the state information from the first element and process 430 the communication session based on the state information for the communication session. A determination 435 can be made as to whether the processing 430 performed by the second element affects or changes the state of the communication session. For example, processing the communication session by the first element may change the routing or other handling of the communication session by other elements therefore leading to a determination 435 that the communication session state has changed. In response to determining 435 that the processing 430 by the second element changes the state of the communication session, state information for the communication session can be updated 440 by the second element based on the processing 430 of the communication session by the second element.

It should be understood that, while only two elements and the processing performed thereby are described here for clarity, additional elements and processing may be implemented. For example, after updating 440 the state information, the second element may return or pass back the state information to the first element. In such a case, the first element may in turn repeat the steps of processing 405 the communication session, updating 415 the state information, if it changes, and passing 420 the state information to the second element, a third element, and/or any other element(s). Similarly, after updating 440 the state information, the second element rather than returning or passing back the state information to the first element, may pass the state information to a third, fourth, fifth, etc element(s) for further communication session processing wherein each of the other elements also can process the communication session, update the communication session state information, pass on the state information accordingly. In this way, the communication session can be composed and the communication session state information can be shared between any number of elements.

The first element and second element described here, as well as any other elements that may be implemented, can comprise application session level components, protocol session level components, and/or combinations thereof. Furthermore, passing or sharing of communication session state information between these elements can be performed in different ways without departing from the scope of the present invention. Generally described, these various ways of sharing communication session state information can include but are not limited to passing state information between elements as part of a protocol session level message, e.g., as part of an expanded header, passing communication session state information as part of a message out of band with protocol session level messages between elements, or by reading/writing state information to a common, shared store of state information. Various examples of different ways to perform communication session state sharing between different types of elements will be described with reference to FIGS. 5-10.

Figure 5:
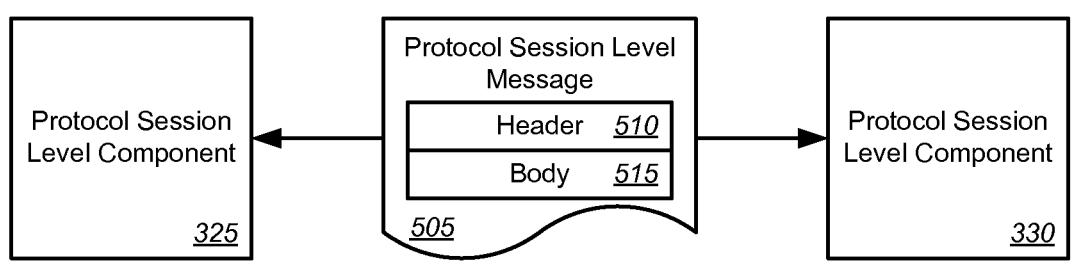
FIG. 5 is a block diagram illustrating an example of composition of elements in a communication session with session sharing according to one embodiment of the present invention.

FIG. 5 is a block diagram illustrating an example of composition of elements in a communication session with session sharing according to one embodiment of the present invention. In this particular example, the first element can comprise a first protocol session level component 325 and the second element can comprise a second protocol session level component 330. In this example, passing the state information from the first protocol session level component 325 to the second protocol session level component 330 can comprise passing the state information as part of a protocol session level message 505. For example, the protocol session level message 505 can comprise a SIP message including a header 510 and a body 515. According to one embodiment, the header 510 of the protocol session level message can be expanded or complemented to include metadata indicating any communication session state information that may be defined.

Figure 6:
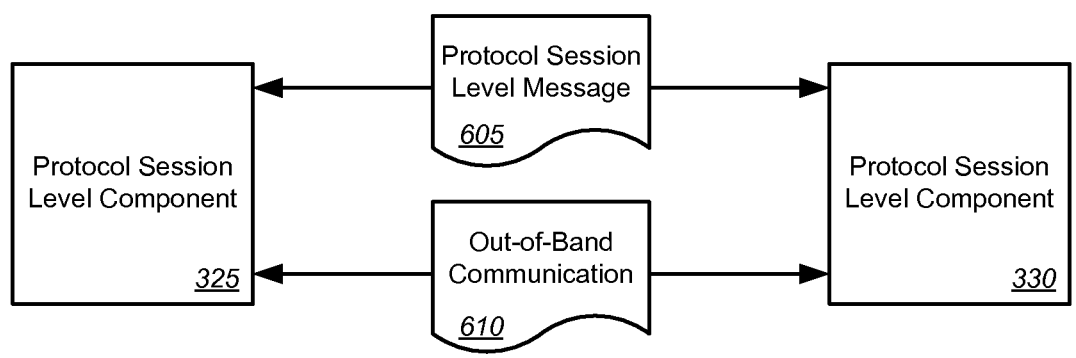
FIG. 6 is a block diagram illustrating an example of composition of elements in a communication session with session sharing according to an alternative embodiment of the present invention.

FIG. 6 is a block diagram illustrating an example of composition of elements in a communication session with session sharing according to an alternative embodiment of the present invention. In this example, the first element can comprise a first protocol session level component 325 and the second element can comprise a second protocol session level component 330. Passing the state information from the first protocol session level component to the second protocol session level component can comprise passing the state information via an out of band communication 610, i.e., a communication out of band from protocol session level exchanges 605 between the first protocol session level component 325 and the second protocol session level component 330.

Figure 7:
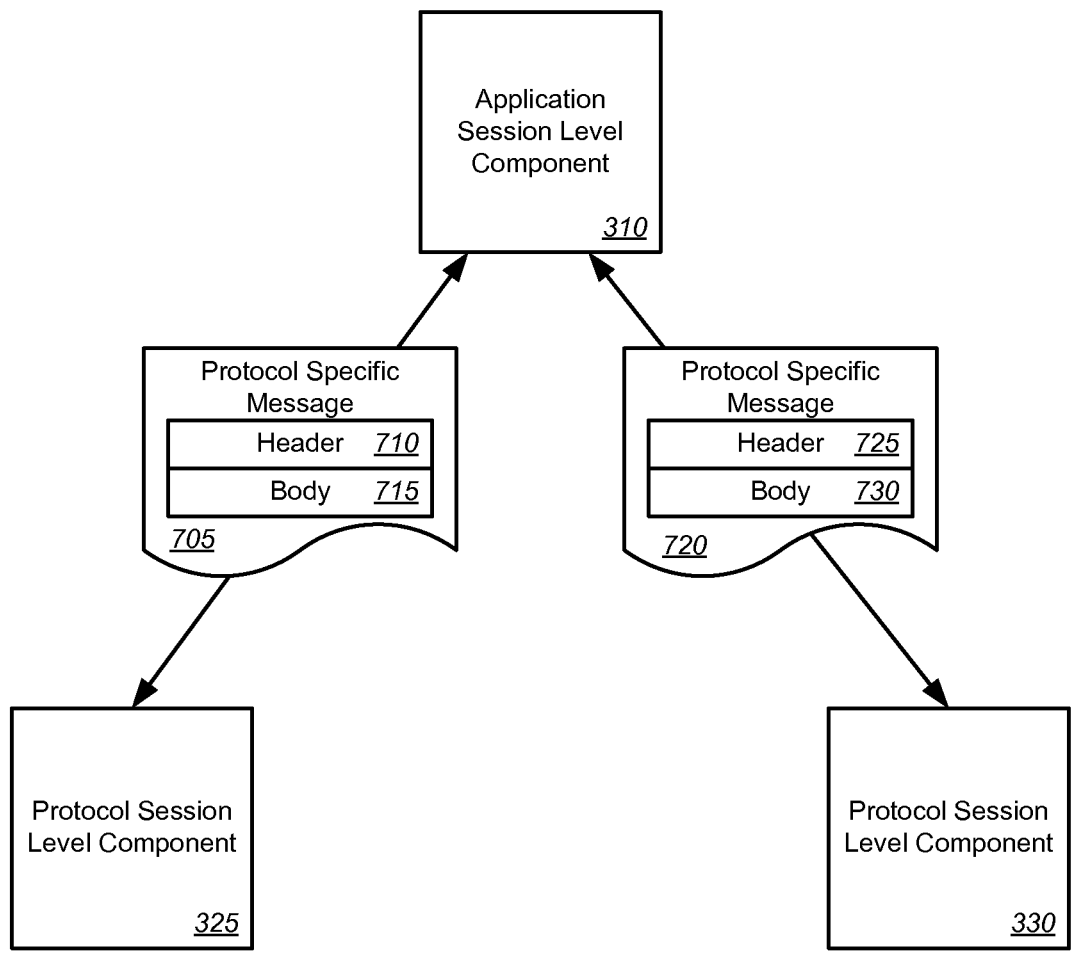
FIG. 7 is a block diagram illustrating an example of composition of elements in a communication session with session sharing according to another alternative embodiment of the present invention.

FIG. 7 is a block diagram illustrating an example of composition of elements in a communication session with session sharing according to another alternative embodiment of the present invention. In this example, the first element can comprises an application session level component 310 and the second element can comprise a first protocol session level component 325. Passing the state information from the application session level component 310 to the first protocol session level component 325 can comprise passing the state information as part of a protocol specific message 705. For example, the protocol specific message 705 can comprise a SIP message including a header 710 and a body 715. According to one embodiment, the header 710 of the protocol specific message 705 can be expanded or complemented to include metadata indicating any communication session state information that may be defined. As noted above, protocol specific messages can also be passed to/from the protocol session level components 325 and 330 via protocol adapters, APIs or other interfaces of the protocol session level components 325 and 330 or SIP servlets, etc. It should also be noted that, while note illustrated here for the sake of clarity, a call controller as described above may be implemented between the protocol session level components 325 and 330 and the application session level component 310. In such a case, the protocol specific messages may be passed to/from the protocol session components 323 and 330 via northbound interfaces of the call controller as described above.

This example can further comprise a second protocol session level component 330. The first protocol session level component 325 can be adapted to pass the updated state information to the application session level component 310 as described above. The application session level component 310 can be adapted to process the communication session based on the updated state information from the first protocol session level component 325 and possibly application session state and/or context information or interactions with other application session level components such as another application, orchestrator, etc. and pass the updated state information for the communication session to the second protocol session level component 330 via a protocol specific message 720. Again, the protocol specific message 720 can comprise a SIP message including a header 725 and a body 730 with the header 725 expanded or complemented to include metadata indicating communication session state information. The second protocol session level component 330 can be adapted to process the communication session based one the updated state information for the communication session from the application session level component 310.

Figure 8:
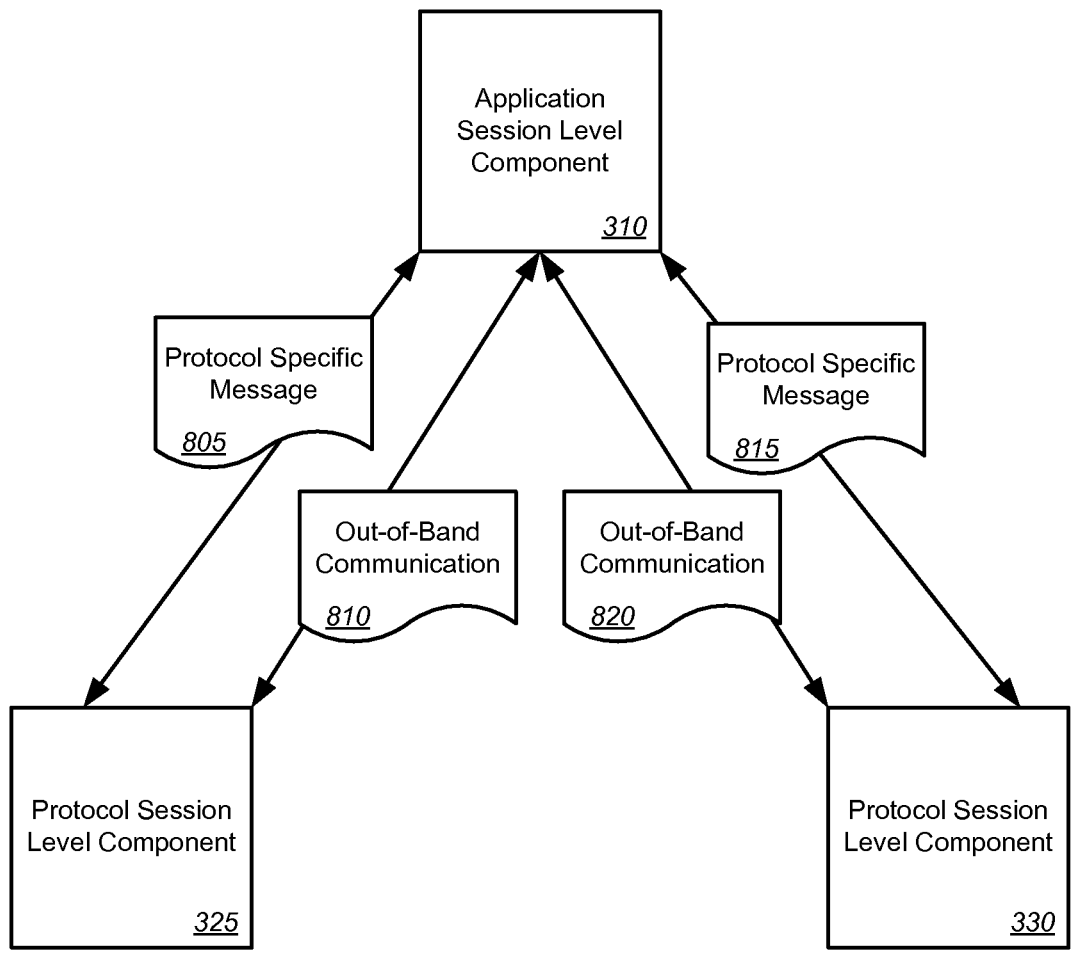
FIG. 8 is a block diagram illustrating an example of composition of elements in a communication session with session sharing according to yet another alternative embodiment of the present invention.

FIG. 8 is a block diagram illustrating an example of composition of elements in a communication session with session sharing according to yet another alternative embodiment of the present invention. In this example, the first element can comprise an application session level component 310, the second element can comprise a first protocol session level component 325. Protocol specific messages 805 and 815 can be passed between the protocol session level components 325 and 330 and the application session level component 310. As noted above, protocol specific messages can be passed to/from the protocol session level components 325 and 330 via protocol adapters, APIs or other interfaces of the protocol session level components 325 and 330 or SIP servlets, etc. It should also be noted that, while note illustrated here for the sake of clarity, a call controller as described above may be implemented between the protocol session level components 325 and 330 and the application session level component 310. In such a case, the protocol specific messages may be passed to/from the protocol session components 323 and 330 via northbound interfaces of the call controller as described above.

Passing the state information from the application session level component to the first protocol session level component 325 can comprise passing the state information in an out of band communication 810, i.e., in a communication out of band from protocol specific messages 805 between the application session level component 310 and the first protocol session level component 325.

This example can further comprise a second protocol session level component 330. The first protocol session level component 325 can be further adapted to pass the updated state information to the application session level component 310, i.e., via out of band communication 810. The application session level component 310 can be further adapted to process the communication session based on the updated state information from the first protocol session level component 325 and possibly application session state and/or context information or interactions with other application session level components such as another application, orchestrator, etc. and pass the state information for the communication session to the second protocol session level component 330 via an out of band communication 820, i.e., a communication out of band from protocol specific messages 815 between the application session level component 310 and the second protocol session level component 330. The second protocol session level component 330 can be adapted to perform communication session processing based one the state information for the communication session from the application session level component 310.

Figure 9:
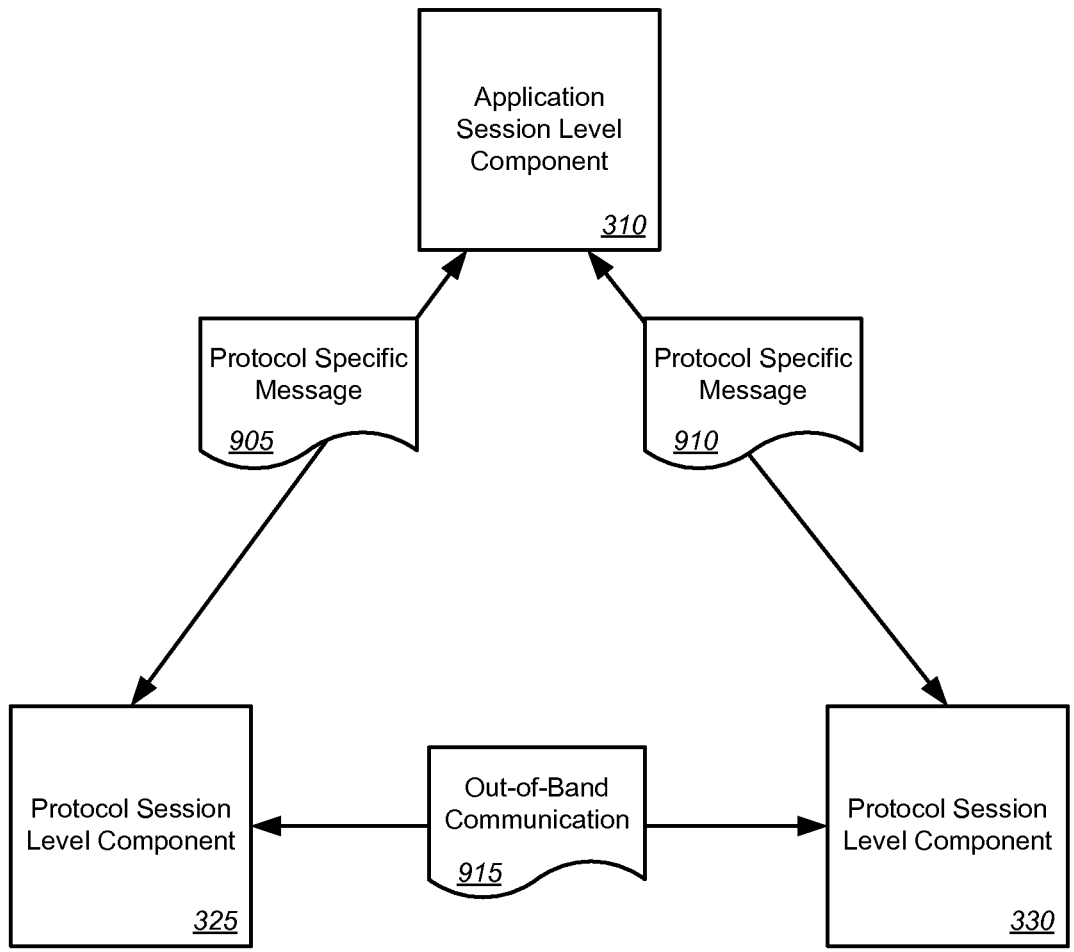
FIG. 9 is a block diagram illustrating an example of composition of elements in a communication session with session sharing according to still another alternative embodiment of the present invention.

FIG. 9 is a block diagram illustrating an example of composition of elements in a communication session with session sharing according to still another alternative embodiment of the present invention. In this example, the first element can comprise a first protocol session level component 325 and the second element can comprise a second protocol session level component 330. Protocol specific messages 905 and 910 can be passed between the protocol session level components 325 and 330 and the application session level component 310. As noted above, protocol specific messages 905 and 910 can be passed to/from the protocol session level components 325 and 330 via protocol adapters, APIs or other interfaces of the protocol session level components 325 and 330 or SIP servlets, etc. It should also be noted that, while note illustrated here for the sake of clarity, a call controller as described above may be implemented between the protocol session level components 325 and 330 and the application session level component 310. In such a case, the protocol specific messages 905 and 910 may be passed to/from the protocol session components 323 and 330 via northbound interfaces of the call controller as described above. In this example, passing the state information from the first protocol session level component 325 to the second protocol session level component 330 can comprise passing the state information via an out of band communication 915, i.e., via a communication out of band from protocol specific messages 905 and 910 between an application session level component 310 and the first protocol session level component 325 and the application session level component 310 and the second protocol session level component 330.

Figure 10:
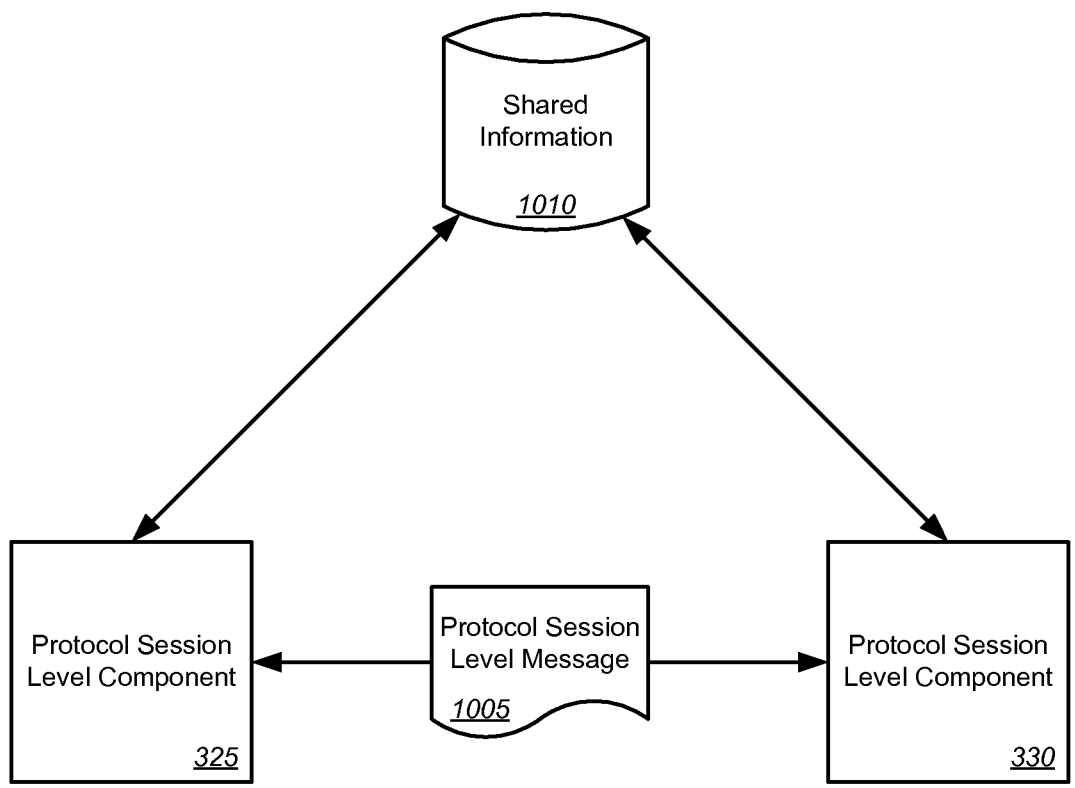
FIG. 10 is a block diagram illustrating an example of composition of elements in a communication session with session sharing according to yet another alternative embodiment of the present invention.

FIG. 10 is a block diagram illustrating an example of composition of elements in a communication session with session sharing according to yet another alternative embodiment of the present invention. In this example, the first element can comprise a first protocol session level component 325 and the second element can comprise a second protocol session level component 330. In this example, passing the state information from the first protocol session level component 325 to the second protocol session level component 330 can comprise writing the state information for the communication session to a set of shared information 1010 with the first protocol session level component 325 and reading the state information for the communication session from the set of shared information 1010 with the second protocol session level component 330. As noted above, passing or sharing of session state information, i.e., writing the session state information to the set of shared information 1010 can be performed synchronously, i.e., by locking the shared information 1010, performing updates of the shared information 1010, and unlocking the shared information 1010 to make the update available to other elements, or asynchronously, i.e., by requesting a change of the shared information 1010 and receiving and/or providing a notification or update of the changed shared information 1010 when completed. Various approaches to performing such synchronous and asynchronous processing can be understood by one skilled in the art. Such variations are contemplated and considered to be within the scope of the present invention.

Writing to and reading from the shared information 1010 can be performed out of band from protocol session level messages 1005 exchanged between the first protocol session level component 325 and the second protocol session level component 330. It should be understood that, while not illustrated here, other elements may also access, i.e., read and/or write, the shared information 1010. For example, one or more application session level components and/or other protocol session level components can be implemented with all or some of theses elements reading and/or writing the shared information 1010.

Figure 11:
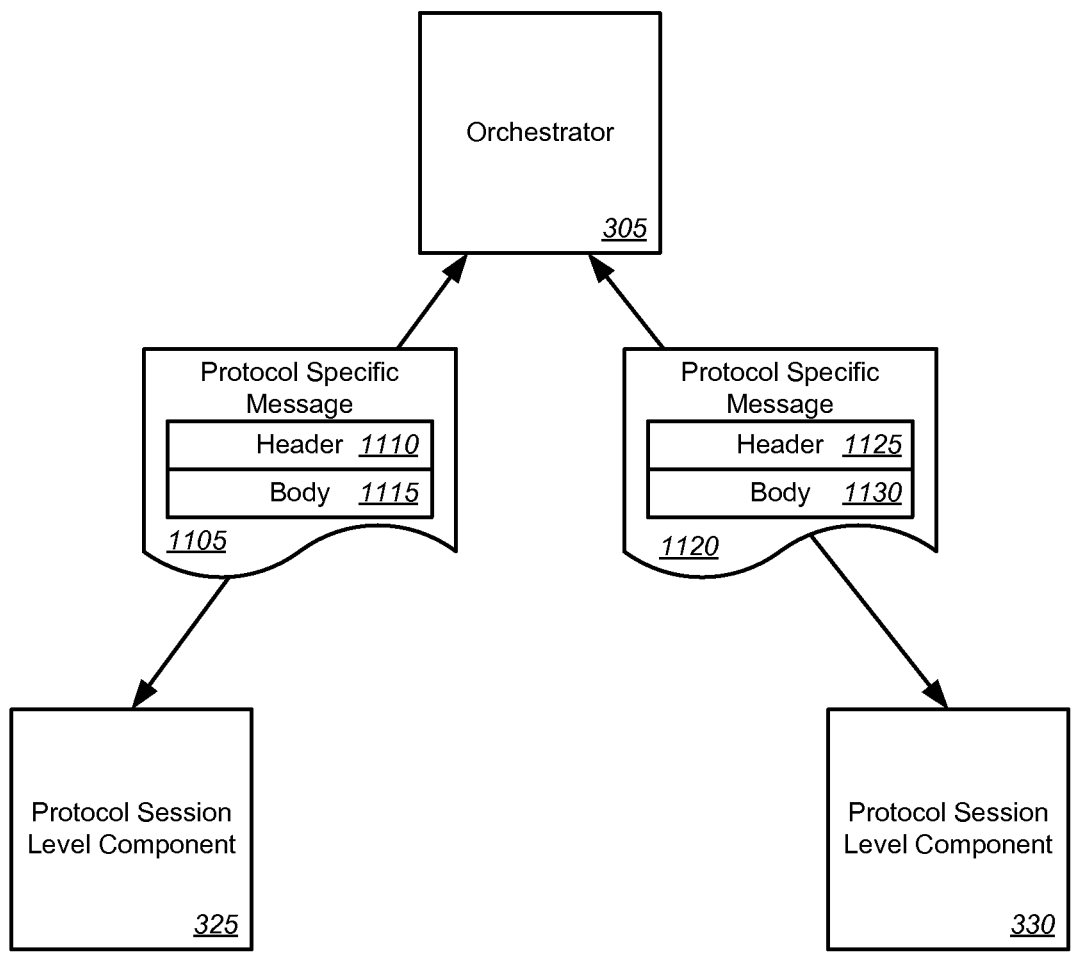
FIG. 11 is a block diagram illustrating an example of composition of elements in a communication session with session sharing according to another alternative embodiment of the present invention.

FIG. 11 is a block diagram illustrating an example of composition of elements in a communication session with session sharing according to another alternative embodiment of the present invention. In this example, the first element can comprises an orchestrator 305 and the second element can comprise a first protocol session level component 325. Passing the state information from the orchestrator 305 to the first protocol session level component 325 can comprise passing the state information as part of a protocol specific message 1105. For example, the protocol specific message 1105 can comprise a SIP message including a header 1110 and a body 1115. According to one embodiment, the header 1110 of the protocol specific message 1105 can be expanded or complemented to include metadata indicating any communication session state information that may be defined. As noted above, protocol specific messages can also be passed to/from the protocol session level components 325 and 330 via protocol adapters, APIs or other interfaces of the protocol session level components 325 and 330 or SIP servlets, etc. It should also be noted that, while note illustrated here for the sake of clarity, a call controller as described above may be implemented between the protocol session level components 325 and 330 and the orchestrator 305. In such a case, the protocol specific messages may be passed to/from the protocol session components 323 and 330 via northbound interfaces of the call controller as described above.

This example can further comprise a second protocol session level component 330. The first protocol session level component 325 can be adapted to pass the updated state information to the orchestrator 305 as described above. The orchestrator 305 can be adapted to process the communication session based on the updated state information from the first protocol session level component 325 and possibly application session state and/or context information or interactions with other components such as another application, orchestrator, etc. and pass the updated state information for the communication session to the second protocol session level component 330 via a protocol specific message 1120. Again, the protocol specific message 1120 can comprise a SIP message including a header 1125 and a body 1130 with the header 1125 expanded or complemented to include metadata indicating communication session state information. The second protocol session level component 330 can be adapted to process the communication session based one the updated state information for the communication session from the orchestrator 305.

Figure 12:
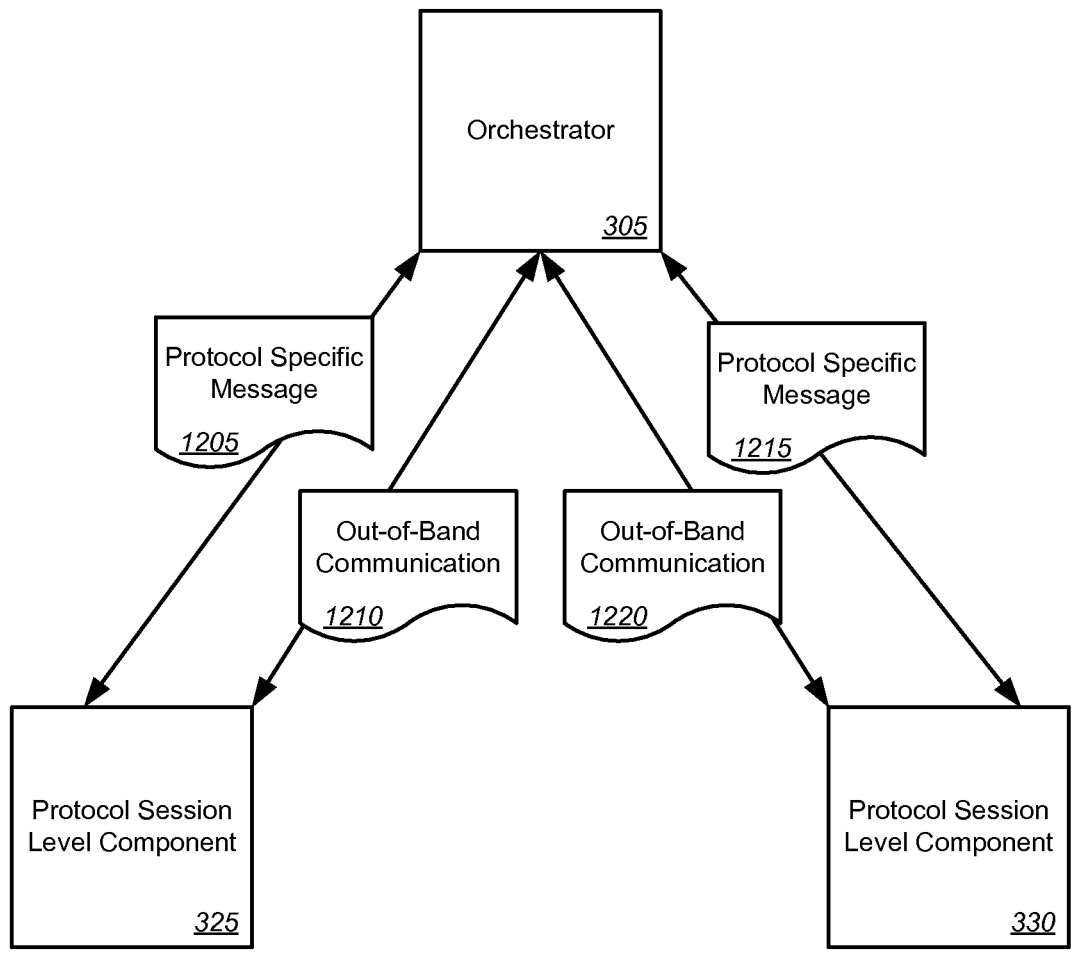
FIG. 12 is a block diagram illustrating an example of composition of elements in a communication session with session sharing according to yet another alternative embodiment of the present invention.

FIG. 12 is a block diagram illustrating an example of composition of elements in a communication session with session sharing according to yet another alternative embodiment of the present invention. In this example, the first element can comprise an orchestrator 305, the second element can comprise a first protocol session level component 325. Protocol specific messages 1205 and 1215 can be passed between the protocol session level components 325 and 330 and the orchestrator 305. As noted above, protocol specific messages can be passed to/from the protocol session level components 325 and 330 via protocol adapters, APIs or other interfaces of the protocol session level components 325 and 330 or SIP servlets, etc. It should also be noted that, while note illustrated here for the sake of clarity, a call controller as described above may be implemented between the protocol session level components 325 and 330 and the orchestrator 305. In such a case, the protocol specific messages may be passed to/from the protocol session components 323 and 330 via northbound interfaces of the call controller as described above.

Passing the state information from the orchestrator 305 to the first protocol session level component 325 can comprise passing the state information in an out of band communication 1210, i.e., in a communication out of band from protocol specific messages 1205 between the orchestrator 305 and the first protocol session level component 325.

This example can further comprise a second protocol session level component 330. The first protocol session level component 325 can be further adapted to pass the updated state information to the orchestrator 305, i.e., via out of band communication 1210. The orchestrator 305 can be further adapted to process the communication session based on the updated state information from the first protocol session level component 325 and possibly application session state and/or context information or interactions with other components such as another application, orchestrator, etc. and pass the state information for the communication session to the second protocol session level component 330 via an out of band communication 1220, i.e., a communication out of band from protocol specific messages 1215 between the application session level component 310 and the second protocol session level component 330. The second protocol session level component 330 can be adapted to perform communication session processing based one the state information for the communication session from the orchestrator 305.

Figure 13:
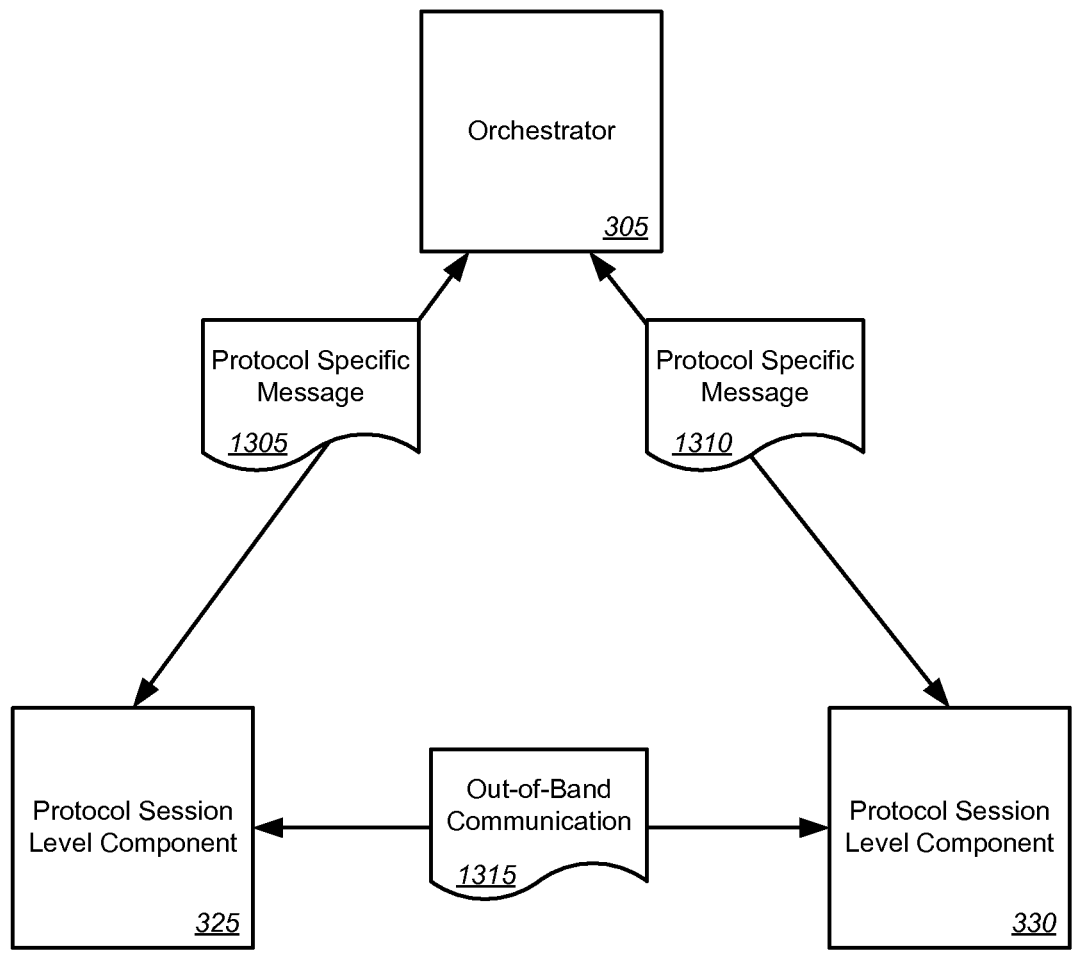
FIG. 13 is a block diagram illustrating an example of composition of elements in a communication session with session sharing according to still another alternative embodiment of the present invention.

FIG. 13 is a block diagram illustrating an example of composition of elements in a communication session with session sharing according to still another alternative embodiment of the present invention. In this example, the first element can comprise a first protocol session level component 325 and the second element can comprise a second protocol session level component 330. Protocol specific messages 1305 and 1310 can be passed between the protocol session level components 325 and 330 and the orchestrator 305. As noted above, protocol specific messages 1305 and 1310 can be passed to/from the protocol session level components 325 and 330 via protocol adapters, APIs or other interfaces of the protocol session level components 325 and 330 or SIP servlets, etc. It should also be noted that, while note illustrated here for the sake of clarity, a call controller as described above may be implemented between the protocol session level components 325 and 330 and the orchestrator 305. In such a case, the protocol specific messages 1305 and 1310 may be passed to/from the protocol session components 323 and 330 via northbound interfaces of the call controller as described above. In this example, passing the state information from the first protocol session level component 325 to the second protocol session level component 330 can comprise passing the state information via an out of band communication 1315, i.e., via a communication out of band from protocol specific messages 1305 and 1310 between an orchestrator 305 and the first protocol session level component 325 and the orchestrator 305 and the second protocol session level component 330.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for composition of elements in a communication session, the method comprising:
    processing the communication session with a device executing a first protocol session level element participating in the communication session at a first level;
    detecting a change in a session state for the communication session by the first protocol session level element;
    updating state information for the communication session with the first protocol session level element in response to detecting the change in the session state for the communication session and based on the processing of the communication session by the first protocol session level element;
    passing the state information from the device executing the first protocol session level element to a device executing a second protocol session level element participating in the communication session at a second level, wherein the device executing the first protocol session level element and the device executing the second protocol session level element are different types of devices, wherein the first level and the second level are different session levels, and wherein the first protocol session level element and the second protocol session level element are orchestrated at an application session level;
    receiving the state information from the first protocol session level element at the second protocol session level element;
    processing the communication session with the second protocol session level element based on the state information for the communication session received from the first protocol session level element;
    detecting a change in a session state for the communication session by the second protocol session level element based on the state information for the communication session received from the first protocol session element; and
    updating the state information for the communication session with the second protocol session level element in response to detecting the change in the session state for the communication session and based on the processing of the communication session by the second protocol session level element.

2. The method of claim 1, wherein the communication session comprises an application session and a protocol session.

3. The method of claim 2, wherein passing the state information from the first protocol session level component to the second protocol session level component comprises passing the state information as part of a header of a protocol session level message.

4. The method of claim 2, wherein passing the state information from the first protocol session level component to the second protocol session level component comprises passing the state information out of band from protocol session level exchanges between the first protocol session level component and the second protocol session level component.

5. The method of claim 2, wherein passing the state information from the first protocol session level component to the second protocol session level component comprises passing the state information out of band from protocol specific exchanges between an application session level component and the first protocol session level component and the application session level component and the second protocol session level component.

6. The method of claim 2, wherein passing the state information from the first protocol session level component to the second protocol session level component comprises writing the state information for the communication session to a set of shared information with the first protocol session level component and reading the state information for the communication session from the set of shared information with the second protocol session level component.

7. The method of claim 1, wherein the state information for the communication session comprises routing information.

8. The method of claim 1, wherein the state information for the communication session comprises routing logic.

9. The method of claim 1, wherein the state information for the communication session comprises status information related to the processing of the communication session.

10. The method of claim 1, wherein updating the state information for the communication session is performed synchronously.

11. The method of claim 1, wherein updating the state information for the communication session is performed asynchronously.

12. A system comprising:
    a communication network adapted to support a communication session via a signaling protocol;
    a first device executing a first protocol session level element communicatively coupled with the communication network and participating in the communication session at a first level, wherein the first element is adapted to perform communication session processing, detect a change in a session state for the communication session, and update state information for the communication session in response to detecting the change in the session state for the communication session and based on the communication session processing; and
    a second device executing a second protocol session level element communicatively coupled with the communication network and participating in the communication session at a second level, wherein the first device and the second device are different types of devices, wherein the first level and the second level are different session levels, wherein the first protocol session level element is further adapted to pass the state information to the second protocol session level element, and wherein the first protocol session level element and the second protocol session level element are orchestrated at an application session level, wherein the second protocol session level element is further adapted to receive the state information from the first protocol session level element, perform communication session processing based on the state information for the communication session received from the first protocol session level element, detect a change in a session state for the communication session based on the state information for the communication session received from the first protocol session element, and update the state information for the communication session in response to detecting the change in the session state for the communication session and based on the communication session processing.

13. A machine-readable memory having stored thereon a series of instruction which, when executed by a processor, cause the processor to perform composition of elements in a communication session by:
processing the communication session with a device executing a first protocol session level element participating in the communication session at a first level;
detecting a change in a session state for the communication session by the first protocol session level element;
updating state information for the communication session with the first protocol session level element in response to detecting the change in the session state for the communication session and based on the processing of the communication session by the first protocol session level element;
passing the state information from the device executing the first protocol session level element to a device executing a second protocol session level element participating in the communication session at a second level, wherein the device executing the first protocol session level element and the device executing the second protocol session level element are different types of devices, wherein the first level and the second level are different session levels, and wherein the first protocol session level element and the second protocol session level element are orchestrated at an application session level;
receiving the state information from the first protocol session level element at the second protocol session level element;
processing the communication session with the second protocol session level element based on the state information for the communication session received from the first protocol session level element;
detecting a change in a session state for the communication session by the second protocol session level element based on the state information for the communication session received from the first protocol session element; and
updating the state information for the communication session with the second protocol session level element in response to detecting the change in the session state for the communication session and based on the processing of the communication session by the second protocol session level element.

* * * * *